United States Patent [19]

Gilberts

[11] 4,128,855

[45] Dec. 5, 1978

[54] SURGE ARRESTER

[75] Inventor: Alexander G. Gilberts, Algonquin, Ill.

[73] Assignee: Reliable Electric Company, Franklin Park, Ill.

[21] Appl. No.: 788,116

[22] Filed: Apr. 18, 1977

[51] Int. Cl.[2] .......... H02H 3/22

[52] U.S. Cl. .......... 361/119; 361/124

[58] Field of Search .......... 361/117, 119, 120, 129, 361/130, 124, 125; 313/217

[56] References Cited

U.S. PATENT DOCUMENTS

| | | | |
|---|---|---|---|
| 1,765,531 | 6/1930 | Howard et al. | 313/243 |
| 2,288,861 | 7/1942 | Watrous, Jr. | 313/249 |
| 2,443,650 | 6/1948 | Berkey | 200/147 R |
| 3,149,263 | 9/1964 | Rabus | 361/130 |
| 3,366,825 | 1/1968 | Lafferty | 313/217 |
| 3,454,811 | 7/1969 | Scudner, Jr. | 313/220 |
| 3,818,259 | 6/1974 | Schleimann-Jensen | 361/120 X |
| 3,818,271 | 6/1974 | Baumbach | 361/119 X |
| 4,013,927 | 3/1977 | Gilberts | 361/119 |

FOREIGN PATENT DOCUMENTS

| | | | |
|---|---|---|---|
| 64890 | 6/1942 | Norway | 361/129 |

*Primary Examiner*—Harry E. Moose, Jr.
*Attorney, Agent, or Firm*—Olson, Trexler, Wolters, Bushnell & Fosse, Ltd.

[57] ABSTRACT

A surge arrester for providing overvoltage protection for communications lines and the like comprises a pair of electrodes having opposed faces to define the arc gap therebetween. The opposed faces include a pair of facing annular, concentric ridges, a valley opening radially inside of the annular ridges and an annular space or opening radially outside of the annular ridges. The valley opening and annular opening extend axially of the ridges to provide a maximum of relief or cavity space for particles that erupt from the electrodes during discharge regardless of the polarity of the electrodes. The cavity space is used for venting erupted particles away from the arc gap.

5 Claims, 10 Drawing Figures

SURGE ARRESTER

CROSS-REFERENCE TO RELATED APPLICATIONS

Reference is hereby made to the inventor's prior application Ser. No. 614,742 filed Sept. 18, 1975 and to the prior art cited therein.

BACKGROUND OF THE INVENTION

This invention relates generally to improvements in surge arresters and more particularly to surge arresters having an arc discharge gap of the type used for protecting telephone lines and other communication lines from over-voltage conditions.

Surge arresters known in the prior art generally comprise a housing that contains a pair of spaced carbon electrodes that define an arc or discharge gap therebetween for grounding excessive line voltages so as to protect both equipment on the line and the line itself. With repeated overvoltage conditions and discharges, carbon particles tend to erupt from the electrode surfaces. These particles often become lodged between the electrodes causing a "noisy" line or even a complete grounding of the line, resulting in failure of the surge arrester after a relatively small number of discharges.

In the design of surge arresters of the foregoing type, a compromise is required between an adequate surge lift (i.e., number of firings) and acceptably low breakdown voltage. Thus, the arc gap can be widened to reduce the possibility of failure due to the presence of lodged carbon particles resulting from eruption during firing. This will, of course, increase the surge life of the arrester. However, widening the arc gap tends to increase the breakdown voltage of the unit beyond acceptable standards.

Also known in the prior art is the idea of providing a plurality of rectangular plateaus and grooves in the faces of the carbon electrodes to provide some release space for the erupted particles to be blown away from the arc gap. This type of a structure is generally known from U.S. Pat. Nos. 571,699 to DeKhotinsky dated Nov. 17, 1896 and Yearance et al. 3,703,665 dated Nov. 21, 1972. However, this arrangement produces multiple discharge surfaces, whereas, for consistent performance of a surge arrester, it is now thought that there should be only a single continuous surface for arc discharge. Further, the plateau in groove or "peak and valley" arrangement is generally maintained on only one of the two electrode faces, resulting in polarity sensitivity of the arrester. That is, the performance of the arrester with the electrodes held at one polarity is not consistent with the performance at the opposite polarity. Further, the peak and valley arrangement of the one electrode face generally lowers the effective surface of the electrode forming the arc gap. Thus, the wearing away of the peak portions of the electrode face, due to particle eruption therefrom during discharge, often results in a widening of the arc gap, thereby increasing the breakdown voltage of the arrester beyond acceptable standards. Further, electrodes of the plateau and groove type are relatively difficult and expensive to manufacture accurately.

OBJECTS AND SUMMARY OF THE INVENTION

Accordingly, it is a general object of the present invention to provide a surge arrester which has a longer and more consistent life than the prior art devices.

A more specific object of the present invention is to provide a surge arrester adapted to minimize the lodging of erupted particles from the electrode surfaces thereof between the electrodes and to provide clearance for particles collected on an electrode, thereby avoiding a nosier arrester or premature failure thereof to ground.

Another object of the present invention is to provide a surge arrester, in accordance with the foregoing objects, which exhibits substantially consistent performance regardless of the polarity of the electrodes thereof.

Yet another object of the present invention is to provide a surge arrester, in accordance with the foregoing objects, constructed so as to minimize the possibility of the breakdown voltage of the unit increasing beyond acceptable standards because of widening of the arc gap caused by erosion of electrode surfaces due to particle eruption during arcing.

Briefly, a surge arrester according to the present invention comprises a housing, a pair of spaced electrodes having transverse ends with an arc gap therebetween, and insulating means surrounding the arc gap and maintaining the electrodes in a spaced apart condition in the housing. A portion of the insulating means is radially spaced from the transverse end of each electrode. Each of the electrodes include facing valleys at their transversed ends, each valley being surrounded by an annular ridge, the annular ridges being concentric and facing each other to define the arc gap. The radial dimension of the ridges is a minor fractional part of the diameter of the transverse end of the associated electrode. The insulating means and the electrodes define an annular cavity that extends axially along a part of the length of each electrode and surrounds the ridges immediately adjacent thereto. The valleys and the cavities define regions of clearance for the collection of erupted particles from the electrodes during discharge and regions of clearance for collection of electrode material on the ridges, regardless of the polarity of the electrodes.

DETAILED DESCRIPTION

Figure 1:
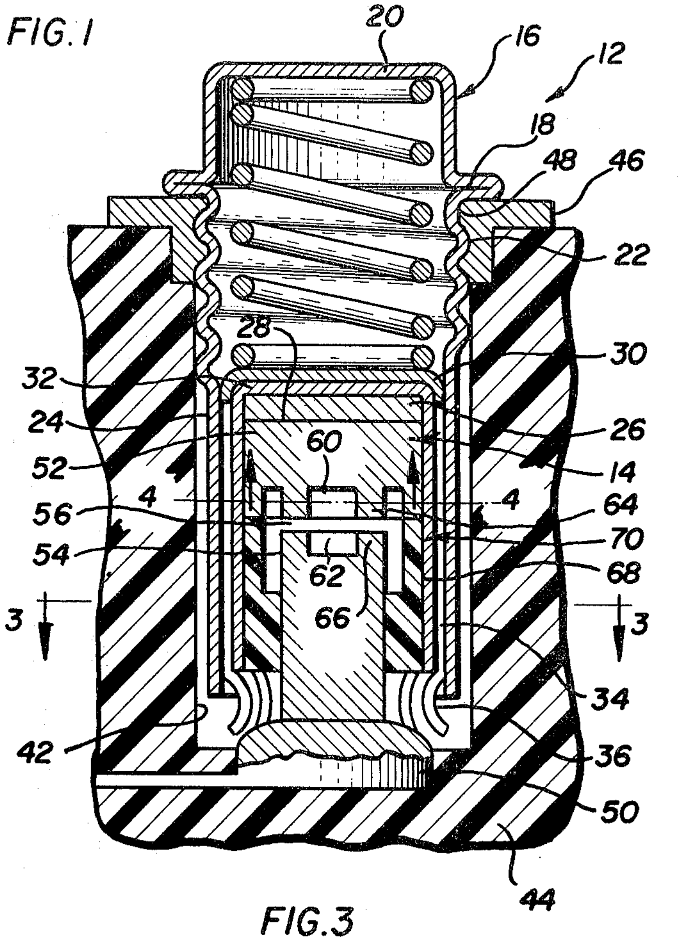
FIG. 1 is a side elevational view, partially cut away, of an overvoltage protector including a surge arrester according to the present invention.
Figure 2:
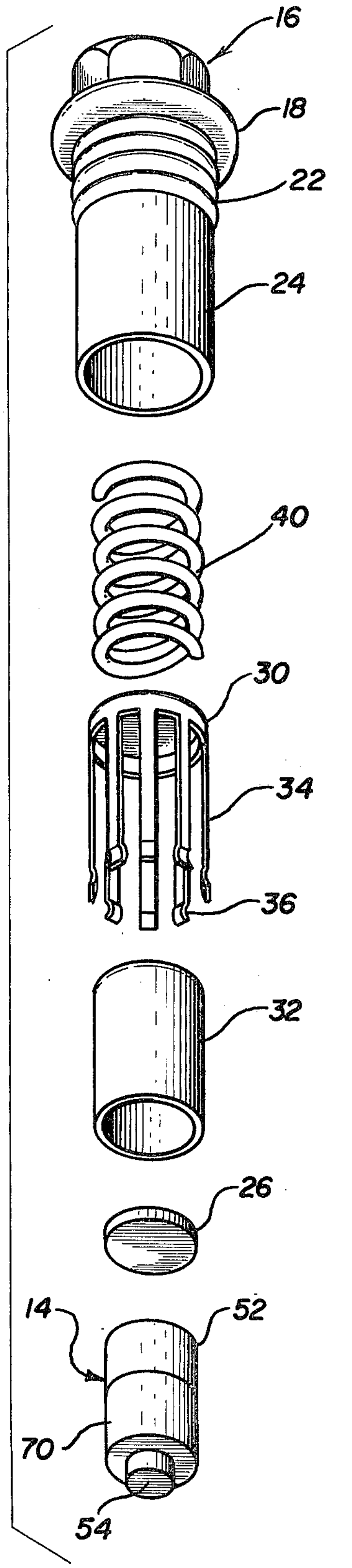
FIG. 2 is an exploded perspective view of a portion of the overvoltage protector of FIG. 1.
Figure 3:
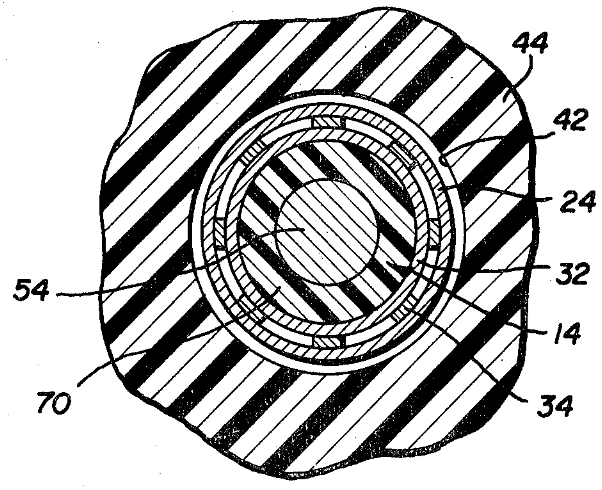
FIG. 3 is a view taken generally along the line 3—3 of FIG. 1.
Figure 4:
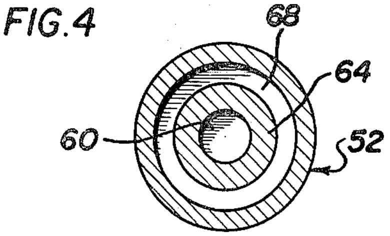
FIG. 4 is a view taken generally along the line 4—4 of FIG. 1.
Figure 5:
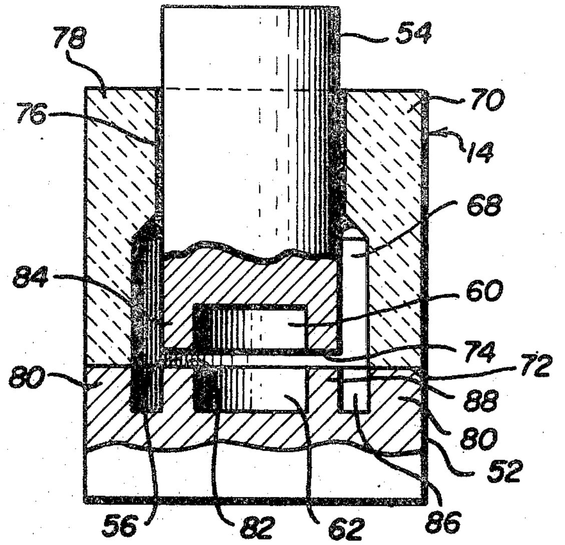
FIG. 5 is a side elevational view, partially cut away, of a surge arrester according to the present invention.
Figure 6:
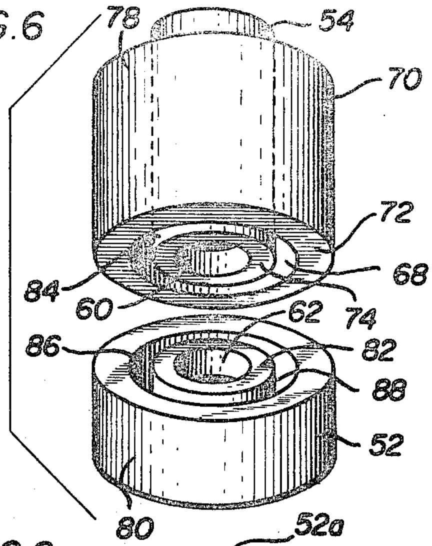
FIG. 6 is an exploded perspective view of the surge arrester of FIG. 5.

Referring now to FIGS. 1 through 4, a protector 12 includes a surge arrester 14 embodying the invention. The protector 12 comprises a sheet metal housing or cap 16 including an annular radial flange 18 that is axially spaced from an end wall 20 of the cap 16. The cap 16 further includes the threaded cylindrical wall 22 and a depending cylindrical skirt 24 adjacent to and extending axially from the thread 22. The skirt 24 terminates in an open end of the cap 16.

A fusible solder pellet 26, in the form of a cylindrical metal disc is disposed against a flat base 28 of the arrester 14. The disc 26 and arrester 14 are held within the cap 16 by a resilient, generally cup-shaped cage 30, adjacent to the skirt or wall 24 of the cap member 16 and a similarly cup-shaped alignment member 32, mounted between the cage 30 and the arrester 14. The cage 30 includes a plurality of circumferentially spaced spring-like fingers 34 which are compressed radially inwardly when the cage 30 is inserted within the tubular skirt 24. The lower end of each finger 34 has an inwardly formed tip 36 such that the tips 36 confine and retain the alignment member 32, the pellet 26 and the arrester 14 within the cage 30.

The alignment member 32 comprises a cup-shaped receptacle for holding the solder pellet 26 and surge arrester 14 in proper alignment and in spaced relation within the cage 30. Thus, the solder pellet 26 and the surge arrester 14 may be inserted within the alignment member 32, and the alignment member 32 positioned within the cage 30, whereupon the cage and those parts assembled therewith may be axially inserted as a unit into the skirt 24. A coil compression spring 40 bears at one end on the end wall 20 of the cap 16 and at its opposite end against the flat end of the cage 30.

The protector 12 is adapted to be mounted in a well 42 of a dielectric block 44. At the upper end of the well 42 is a metallic contact plate 46 having an internally threaded annular flange 48 for receiving the cap thread 22. The material of the block 44 below the flange 48 is also threaded for some distance so that the cap may be threaded into the well 42 until the flange 18 abuts the contact plate 46. At the bottom of the well 42 is a metallic contact button 50 that is adapted to engage the end of the surge arrester 14. The reaction force of the compressed spring 40 maintains the arrester 14 firmly against the contact button 50. The contact plate 46 and the contact button 50 may be suitably electricaly connected to binding posts, clip type terminals, or other terminals (not shown) so that the plate 46 may be grounded and the contact button 50 connected to a telephone line, or the like, to be protected or vice-versa. The protector and block arrangement shown in FIG. 1 may have any orientation. Thus, the arrester 14 may be either horizontal or vertical or somewhat therebetween. In addition, the arrester 14 may be embodied into other types of protectors, for example, those central office equipment protectors of the type shown in U.S. Pat. No. 3,794,947 to Baumbach issued Feb. 26, 1974.

It will be appreciated that when a voltage (with respect to ground) appears on the line to be protected, that exceeds the breakdown voltage of the unit, the protector, via the action of the arrester 14, to be described in detail below, will cause current to flow from the line to ground. The protector unit is self-restoring under these conditions, so nothing need be done to place it in condition for repeated grounding of the line, as necessitated by subsequent over-voltage conditions.

In contrast, when an overcurrent occurs on the line, as for example, due to a prolonged voltage that is above the arcing voltage of the arrester 14, the protector provides another protection mechanism. The current through the protector will cause the solder 26 to melt, allowing the spring 40 to force the cage 30 toward the button 50. The ends 36 of the fingers 34 thereof make contact with the button 50, thereby providing a current path from the button 50 to the contact plate 46. Thus, the overcurrent is shunted to ground. The protector is, of course, not self-restoring in this mode of operation. Repeated overvoltage conditions of the former type, however, tend to reduce the life of the arrester 14. For this reason, the present invention provides an improved configuration of the arrester 14.

Turning now more particularly to the arrester 14, as best seen in FIGS. 1 through 6, first and second generally cylindrical carbon electrodes 52, 54 define an arc gap 56 generally between their transverse ends. Insulating and spacing means such as insulator member 70 of ceramic or the like are provided, surrounding the electrode 54 and arc gap 56 and maintaining the electrodes 52, 54 in a spaced apart condition, a portion of the insulating and spacing means such as the member 70 being radially spaced from the transverse end of each electrode. Each of the electrodes 52, 54 have facing valleys 60, 62 at their transverse ends, each valley being surrounded by an annular ridge 64, 66, the annular ridges being concentric and facing each other to define the arc gap 56. The ridges 64, 66 each have a radial dimension that is a minor fractional part of the diameter of the transverse end of the associated electrodes 52, 54.

The insulating and spacing means including the member 70 and the electrodes 52, 54 and particularly the annular ridges 64, 66 thereof, define an annular cavity 68 therebetween that extends axially along a part of the length of each electrode and surrounds the ridges 64, 66 immediately adjacent thereto. The valleys 60, 62 and annular cavity 68 provide regions of clearance for the collection of electrode material on the ridges 64, 66 and for the collection of erupted particles from the electrodes 52, 54 during arc discharge, regardless of the polarity of the electrodes 52, 54. The electrode 54 is bonded to and is surrounded by the ceramic or like insulator 70 which constitutes the insulating and spacing means of FIGS. 1 through 6. The insulator 70 has an upper flat end face 72 spaced from a transverse end 74 of the electrode 54, whereby the end 54 is recessed within the insulator 70. It will also be noted that the electrode 54 is bonded by a suitable adhesive to the insulator 70 along a portion 76 thereof, such that the electrode 54 projects outwardly beyond the end 78 of the insulator 70. Also, the diameter of the electrode 54 is less than the inner diameter of the insulator 70 remote from the end 76 thereof, whereby an annular space or cavity is formed therebetween, comprising a portion of the cavity 68 of FIGS. 1 through 6.

The second electrode 52 has a transverse end including a generally annular ridge 80 to provide adequate support for the electrode 52 on the end face 72 of the insulator 70. It will be noted that the annular ridge 80 and the end face 72 of the insulator 70 are substantially concentric and symmetrical. The annular ridge 80 is seated upon the insulator 70 forming the insulating and spacing means of FIGS. 1 through 6. The electrode 52 has a transverse end face 82, generally coplanar with the end surfaces of the ridge 80 abutting the insulator face 72. Consequently, the seating of the ridge 80 on the insulator end face 72 provides the arc gap 56 of FIG. 5 whose width is determined by the extent of the recess of the electrode 54 within the insulator 70.

As mentioned above, electrode 54 includes the valley opening 62 at its transverse end 74, the valley 62 being of such radial dimension as to leave the annular ridge 66, whose axial dimension defines the transverse end 74 of the electrode 54 and is radially intermediate the valley 60 and the annular cavity 68. Similarly, the electrode 52 has the valley 60 extending inwardly of the transverse end 82 thereof, the valley 60 being substantially concentric with the valley 62, such that the two valleys 60, 62 face each other at the arc gap 56. The electrode 52 also has an annular cavity 86 radially outwardly spaced from the valley 60 and of substantially the same radial dimension as and forming a part of the annular cavity 68. Thus, between the valley 60 and the annular cavity 86, there is defined the annular ridge 64 of the electrode 52 that concentrically faces the annular ridge 66 on the electrode 54, to define the arc gap 56 therebetween. It will be appreciated then, that this arrangement leaves the valleys 60, 62 and annular cavity 68 as regions of clearance for collection of electrode material on the ridges 64, 66, such as at the edges and sides thereof, and for the collection of erupted particles from the electrodes 52 and 54 during arc discharge, regardless of the polarity of the electrodes 52, 54.

Figure 7:
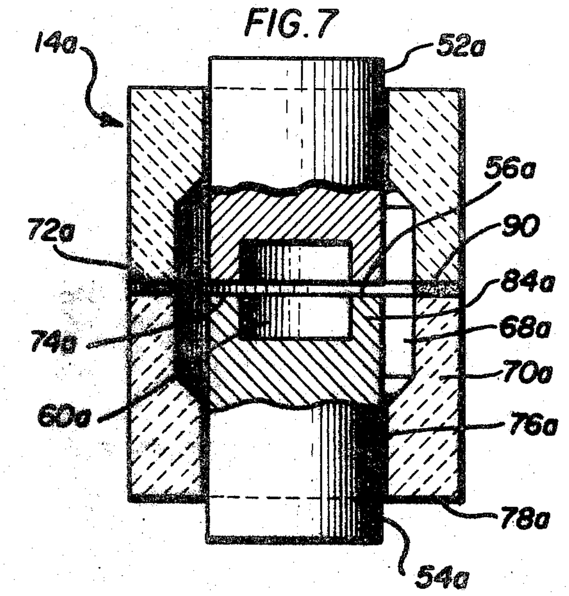
FIG. 7 is a side elevational view, partially cut away of a second embodiment of a surge arrester, in accordance with the present invention.
Figure 8:
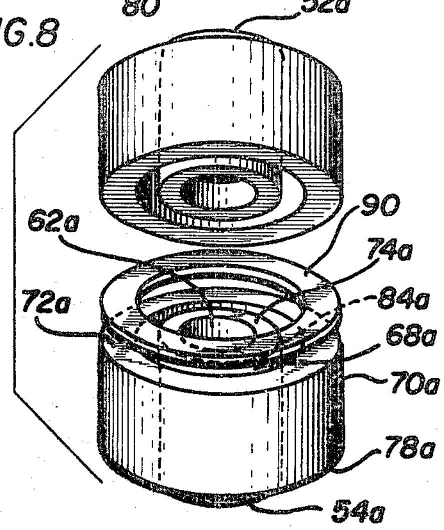
FIG. 8 is an exploded perspective view of the surge arrester of FIG. 7.

Referring now to FIG. 7 and FIG. 8, a second embodiment of a surge arrester 14 is shown in additional detail. To facilitate clarity in the description of the second embodiment of FIGS. 7 and 8, the same reference numerals have been used with the subscript *a* added. The surge arrester **14*a* comprises two substantially identical portions including carbon electrodes 52*a* and 54*a*. Thus, only the electrode 54*a* and associated elements will be described in detail, it being understood that the electrode 52*a* and its associate elements are substantially identical. The electrodes 52*a* and 54*a* face each other across an arc gap 56. Insulating and spacing means including a spacing member 90 and an insulator 70*a* are provided surrounding the arc gap 56*a* and maintaining the electrodes 52*a*, 54*a* in spaced apart condition. The spacing member 90 comprises a generally annular ring. The electrode 54*a* is bonded to and surrounded by the ceramic or like insulator 70*a* having an end face 72*a* generally coplanar with a transverse end 74*a* of the electrode 54*a*. It will be noted that the end face 72*a* of the insulator 70*a* defines an annular ring surface generally concentric with and of substantially the same dimensions as the spacer 90. The end face 72*a* of the insulator 70*a* is bonded to the spacing member 90 by a suitable adhesive. The insulator 70*a* is also bonded to the electrode 54*a* by a suitable adhesive at a portion 76*a* thereof, such that the electrode 54*a* projects outwardly beyond the end 78*a* of the insulator 70*a*. The diameter of the electrode 54*a* is less than the inner diameter of the insulator 70*a* remote from the portion 76*a* thereof, whereby an annular space 68*a* is defined between the electrode 54*a* and the inner wall of the insulator 70*a*. The electrode 54*a* has a valley 62 at its transverse end, the valley 62 being of such dimension so as to define, with the annular cavity 68*a* an annular ridge 66 in the transverse end 74*a* of the electrode 54**.

It will be appreciated from the foregoing that the electrodes **52*a* and 54*a* thus each have facing valleys at their transverse ends, each valley being surrounded by an annular ridge, the annular ridges being concentric and facing each other to define the arc gap 56*a*. Also, the insulators and electrodes 52*a* and 54*a* define between them the annular cavity 68*a* extending axially along a part of the length of each electrode and surrounding the ridges so that the valleys 60*a*, 62*a* and annular cavity 68*a* provide regions of clearance for collection of erupted particles from the electrodes during arc discharge regardless of the polarity of the electrodes 52*a*, 54*a***.

Figure 9:
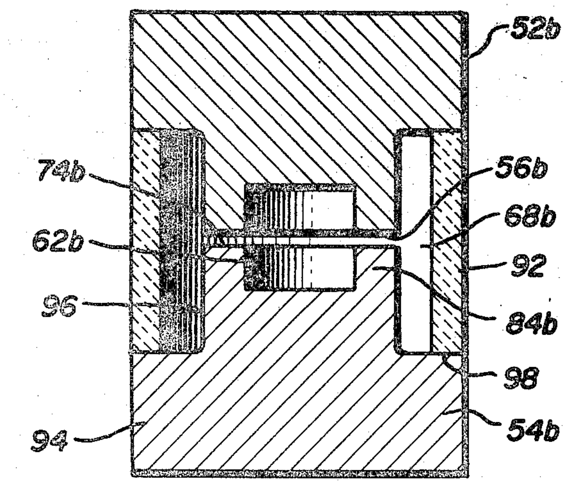
FIG. 9 is a side elevational view, partially cut away of another embodiment of a surge arrester in accordance with the present invention.
Figure 10:
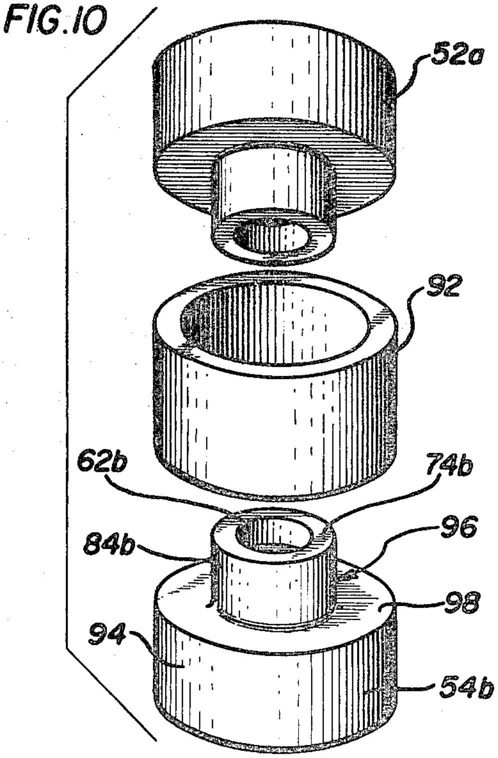
FIG. 10 is an exploded perspective view of the surge arrester of FIG. 9.

Referring now to FIGS. 9 and 10, yet another embodiment of a surge arrester according to the present invention is illustrated. Again, to facilitate clarity, the same reference numerals are used in FIGS. 9 and 10, together with the subscript *b* to indicate similar elements. The electrodes **52*b* and 54*b* of FIG. 9 and FIG. 10 are substantially identical, and face each other across an arc gap 56*b*, the width of which is set by a generally tubular or cylindrical insulating and spacing means 92. The electrode 54*b* has an outer portion 94 of substantially the same diameter as the insulating and spacing member 92, abutting the insulating and spacing means 92 along a generally annular facing surface 98 thereof. The electrode 54*b* also has a second or inner portion 96 of smaller diameter than the insulating and spacing means 92 whereby the portion 96 of the electrode 54*b* and the spacing and insulating member 92 form between them an annular cavity 68*b*. The electrode 54*b* also has a valley 62*b* formed in its transverse end 74*b*. The valley 62*b* is of such dimension that it defines an annular ridge 66 in the transverse end 74*b* of the electrode 54*b*, which defines one side of the arc gap 56*b*. It will be appreciated then, that the electrodes 52*b* and 54*b*, being identical, have facing valleys at their transverse ends, each valley being surrounded by an annular ridge, the annular ridges being concentric and facing each other to define the arc gap 56*b*. Further, the electrodes 52*b* and 54*b* and the insulating and spacing means 92 form between them an annular cavity 68*b* that extends axially along a part of the length of each electrode 52*b*, 54*b* and surrounds the annular ridges, so that the valleys 60*a*, 62*b* and cavity 68*b* are regions of clearance for the collection of electrode material on the ridges and for the collection of erupted particles from the electrodes during arc discharge regardless of the polarity of the electrodes 52*b*, 54*b***.

In surge arresters constructed in accordance with the foregoing description, the regions for collection of erupted electrode particles provide a substantial increase in the life of the arrester, and more consistent operation over the life thereof. Further, the provision of regions for collection of electrode material on the ridges tends to minimize the widening of the arc gap by erosion and to provide a failure made of the arrester consistently to ground rather than to an open circuit or unacceptably high breakdown voltage. It will also be apparent that the arresters described are relatively simple and inexpensive to manufacture.

While particular embodiments of the invention have been shown and described, various changes may occur to those skilled in the art, and it will be understood as forming a part of the invention insofar as they fall within the spirit and scope of the appended claims.

The invention is claimed as follows:

1. In a surge arrester providing overvoltage protection for a communications line or the like, and which comprises a pair of carbon electrodes having transverse ends with an arc gap of air therebetween, insulating and spacing means surrounding the arc gap and maintaining the electrodes in a spaced apart condition, a portion of the insulating and spacing means being radially spaced from said transverse end of each electrode, each of said electrodes having facing valleys at their transverse ends, each valley being surrounded by an annular ridge and with the annular ridges being concentric and facing each other to define said arc gap, the ridges each having a radial dimension that is a minor fractional part of the diameter of the transverse end of the associated electrode, said insulating and spacing means and said electrodes defining an annular cavity that extends axially along a part of the length of each electrode and surrounds said ridges immediately adjacent thereto, said valleys and said annular cavity each being sufficiently wide such that the valleys and the cavity are regions of clearance for collection of electrode material on the ridges and for substantially freely accepting a collection of erupted particles from said electrodes during arc discharge regardless of polarity of the electrodes.

2. In a surge arrester according to claim 1, said insulating and spacing means including insulators that surround the electrodes respectively and are bonded one to each electrode and a spacing ring, the insulators abutting said spacing ring on opposite sides thereof and the transverse ends of the electrodes being spaced apart together with the insulators by the width of the spacing ring.

3. In a surge arrester according to claim 1, one of said electrodes being bonded to the insulating means of said insulating and spacing means and the other of said electrodes being a disc that contains a portion of said annular cavity.

4. In a surge arrester according to claim 1, said electrodes having facing, axially presented shoulders axially remote from said ridges, said shoulders abutting opposite ends of the insulating means of said insulating and spacing means.

5. In a surge arrester for providing overvoltage protection for a communications line or the like and which comprises a housing, a pair of spaced carbon electrodes, insulating means assembled with and surrounding a first of said electrodes and with a transverse end of said first electrode being recessed within said insulating means, an end portion of the insulating means being radially spaced from an end portion of said first electrode, said electrode end portion including said transverse end, said end portions defining an annular cavity opening at said transverse end and extending axially over a fractional part of the length of the assembled insulating means and first electrode, the second of said electrodes having a transverse end seated on said end portion of said insulating means and presented toward said end portion of said first electrode whereby an arc gap of air is provided that has a dimension thereacross determined by the extent of the recess of said first electrode within said insulating means, and means for retaining said electrodes and said insulating means in said housing; an improvement comprising said first electrode end portion having a valley opening at the transverse end of said first electrode, said valley being of such radial dimension as to leave an annular ridge that defines said first electrode transverse end and is radially intermediate said valley and said annular cavity, said second electrode having a valley opening at said transverse end thereof and being substantially concentric with the valley in the first electrode such that the two valleys face each other at said arc gap, said second electrode also having an annular cavity radially outwardly spaced from said second electrode valley and being concentric with said first mentioned cavity and also being of substantially the same radial dimension as said first mentioned cavity, thereby to provide an annular ridge on said second electrode that concentrically faces the annular ridge on the first electrode to define the arc gap, said valleys and said annular cavity each being sufficiently wide such that said valleys and said cavities provide regions of clearance for collection of electrode material on the ridges during arc discharges and for substantially freely accepting a collection of erupted particle from said electrodes regardless of polarity of the electrodes.

* * * * *